United States Patent
Schmidl et al.

(10) Patent No.: US 8,437,245 B2
(45) Date of Patent: May 7, 2013

(54) WIRELESS NETWORK SYSTEM

(75) Inventors: Timothy M. Schmidl, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 263 days.

(21) Appl. No.: 12/873,086

(22) Filed: Aug. 31, 2010

(65) Prior Publication Data

US 2011/0051706 A1    Mar. 3, 2011

Related U.S. Application Data

(60) Provisional application No. 61/238,513, filed on Aug. 31, 2009.

(51) Int. Cl.
 *H04J 11/00* (2006.01)
 *H04J 3/06* (2006.01)

(52) U.S. Cl.
 USPC .......................................... 370/208; 370/509

(58) Field of Classification Search ............... 370/208, 370/509
 See application file for complete search history.

(56) References Cited

U.S. PATENT DOCUMENTS

| | | | |
|---|---|---|---|
| 2005/0123060 A1* | 6/2005 | Maltsev et al. | 375/260 |
| 2006/0120311 A1* | 6/2006 | Berkovich | 370/310 |
| 2006/0126492 A1* | 6/2006 | Hyun et al. | 370/208 |
| 2007/0064735 A1* | 3/2007 | Hoo et al. | 370/468 |
| 2009/0279620 A1* | 11/2009 | Schenk | 375/260 |
| 2010/0146351 A1* | 6/2010 | Kakani et al. | 714/746 |
| 2010/0272212 A1* | 10/2010 | Miyoshi et al. | 375/295 |
| 2012/0170625 A1* | 7/2012 | Kim et al. | 375/219 |
| 2012/0170672 A1* | 7/2012 | Sondur | 375/260 |

OTHER PUBLICATIONS

Institute of Electrical and Electronics Engineers, Inc., "IEEE Standard for Information technology—Telecommunications and information exchange between systems—Local and metropolitan area networks—Specific requirements," Part 15.4: Wireless Medium Access Control (MAC) and Physical Layer (PHY) Specifications for Low-Rate Wireless Personal Area Networks (WPANs), IEEE Std 802.15.4™, Sep. 8, 2006, New York, NY.

* cited by examiner

*Primary Examiner* — Andrew Lee
(74) *Attorney, Agent, or Firm* — John R. Pessetto; W. James Brady; Frederick J. Telecky, Jr.

(57) ABSTRACT

A integrated circuit includes logic configured to support smart-utility-network communication using an integer number of data bits per symbol for 96, 48, 24, 12, and 4 data subcarriers across IFFT sizes of 128, 64, 32, 16, and 8.

5 Claims, 5 Drawing Sheets

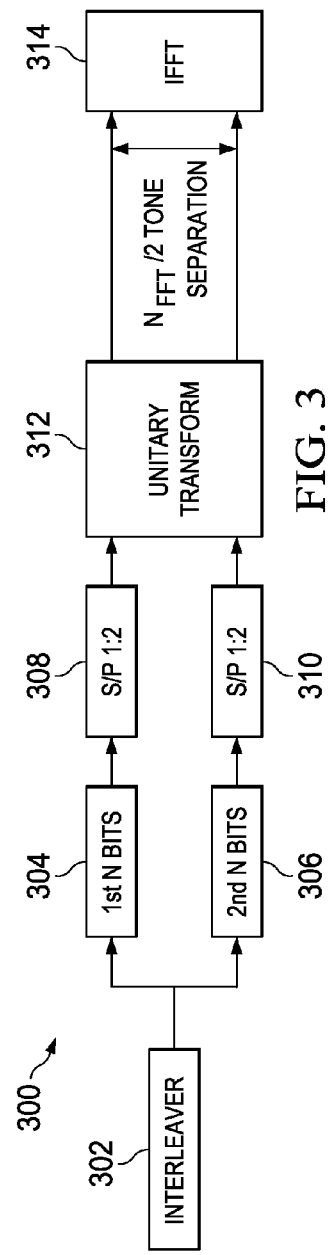

WIRELESS NETWORK SYSTEM

CROSS-REFERENCE TO RELATED APPLICATION

The present application claims priority to U.S. Provisional Patent Application No. 61/238,513, filed on Aug. 31, 2009; which is hereby incorporated herein by reference.

BACKGROUND

Wireless personal area networks ("WPANs") are used to convey information over relatively short distances. Unlike wireless local area networks ("WLANs"), WPANs need little or no infrastructure, and WPANS allow small, power-efficient, and inexpensive solutions to be implemented for a wide range of devices. Smart Utility Networks ("SUNs") may operate either over short ranges such as in a mesh network where utility meter information is sent from one utility meter to another or over longer ranges such as in a star topology where utility meter information is sent to a poletop collection point. The terms WPAN and SUN are used interchangeably in this document.

SUMMARY

Systems for implementing smart utility networks are described herein. In at least some disclosed embodiments, an integrated circuit includes logic configured to support smart-utility-network communication using an integer number of data bits per symbol for 96, 48, 24, 12, and 4 data subcarriers and 8, 4, 2, 2, and 2 pilot subcarriers across IFFT sizes of 128, 64, 32, 16, and 8.

In other disclosed embodiments a machine-readable storage medium includes executable instructions that, when executed, cause one or more processors to support smart-utility-network communication using an integer number of data bits per symbol for 96, 48, 24, 12, and 4 data subcarriers and 8, 4, 2, 2, and 2 pilot subcarriers across IFFT sizes of 128, 64, 32, 16, and 8, respectively. The total number of subcarriers is 104, 52, 26, 14, and 6, respectively. The IFFT sizes are the minimum to implement each option, and larger IFFTs can be used at the transmitter in order to oversample the signal.

In yet other disclosed embodiments, a device includes a processor and memory coupled to the processor. The processor supports smart-utility-network communication using an integer number of data bits per symbol for 96, 48, 24, 12, and 4 data subcarriers and 8, 4, 2, 2, and 2 pilot subcarriers across IFFT sizes of 128, 64, 32, 16, and 8.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts:

FIGS. 2A-2B illustrate a packet format and packet header format, respectively, in accordance with various illustrated embodiments;

FIG. 3 illustrates a DCM transmitter in accordance with at least some illustrated embodiments;

NOTATION AND NOMENCLATURE

Figure 1:
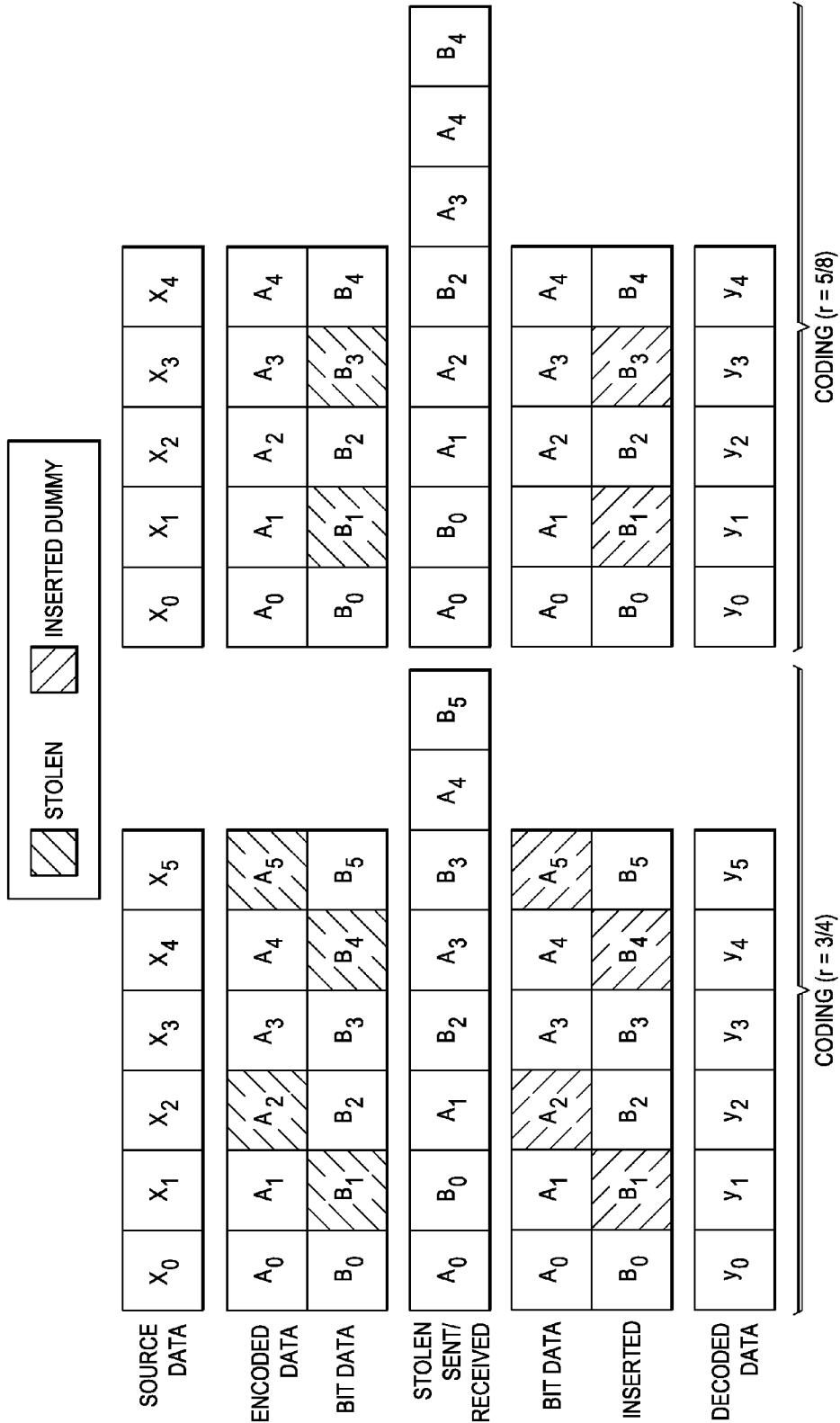
FIG. 1 illustrates coding patterns in accordance with various illustrated embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

A WPAN or low-rate WPAN is a simple, low-cost communication network that allows wireless connectivity in applications with limited power and relaxed throughput requirements. The main objectives of a WPAN are ease of installation, reliable data transfer, short-range operation, extremely low cost, reasonable battery life, and a simple but flexible protocol.

Some characteristics of a WPAN are:
- Over-the-air data rates of 250 kb/s, 100 kb/s, 40 kb/s, and 20 kb/s
- Star or peer-to-peer or mesh operation
- Allocated 16-bit short or 64-bit extended addresses
- Optional allocation of guaranteed time slots
- Carrier sense multiple access with collision avoidance channel access
- Low power consumption
- Energy detection
- Link quality indication
- 16 channels in the 2450 MHz band, 30 channels in the 915 MHz band, and 3 channels in the 868 MHz band.

These characteristics are not requirements, and each WPAN may deviate from the characteristics in numerous ways. Two different device types can participate in a WPAN: a fullfunction device ("FFD") and a reduced-function device ("RFD"). The FFD can operate in modes such as serving as a personal area network ("PAN") coordinator or a device. A FFD can talk to RFDs or other FFDs while a RFD can talk only to a FFD. More information can be found at IEEE Std. 802.15.4-2006 available at http://www.ieee802.org/15/pub/TG4.html and hereby incorporated by reference.

data bits per OFDM symbol to integers. Specifically, the modulation coding scheme ("MCS") level, number of data sub-carriers, number of coded bits per symbol, and transmission rate are adjusted such that the number of data bits per symbol is an integer. For example, at MCS level 1, using 96 data sub-carriers, 48 coded bits per symbol, and a transmission rate of 187.5 kbps creates 24 data bits per symbol. In various embodiments, the various parameters are adjusted.

TABLE 1

Example of Eliminating Non-Integer $N_{DBPS}$

| | Number of Data Sub-Carrier (NDSC) | | | | | | | | | | | | | | |
|---|---|---|---|---|---|---|---|---|---|---|---|---|---|---|---|
| | 96 (8 pilots) | | | 48 (4 pilots) | | | 24 (2 pilots) | | | 12 (2 pilots) | | | 4 (2 pilots) | | |
| MCS | NCBPS | NDBPS | Rate | NCBPS | NDBPS | Rate (kbps) | NCBPS | NDBPS | Rate | NCBPS | NDBPS | Rate | NCBPS | NDBPS | Rate (kbps) |
| 0 | 24 | 12 | 93.75 | | | | | | | | | | | | |
| 1 | 48 | 24 | 187.5 | 24 | 12 | 93.75 | 12 | 6 | 46.88 | | | | | | |
| 2 | 96 | 48 | 375 | 48 | 24 | 187.5 | 24 | 12 | 93.75 | 12 | 6 | 46.88 | | | |
| 3 | 96 | 72 | 562.5 | 48 | 36 | 281.25 | 24 | 18 | 140.63 | 12 | 9 | 70.31 | | | |
| 4 | 192 | 96 | 750 | 96 | 48 | 375 | 48 | 24 | 187.5 | 24 | 12 | 93.75 | | | |
| 5 | 192 | 120 | 937.5 | 96 | 60 | 468.75 | 48 | 30 | 234.38 | 24 | 15 | 117.19 | | | |
| 6 | | | | 96 | 72 | 562.5 | 48 | 36 | 281.25 | 24 | 18 | 140.63 | 8 | 6 | 46.88 |
| 7 | | | | 192 | 96 | 750 | 96 | 48 | 375 | 48 | 24 | 187.5 | 16 | 8 | 62.5 |
| 8 | | | | 192 | 120 | 937.5 | 96 | 60 | 468.75 | 48 | 30 | 234.38 | 16 | 10 | 78.13 |
| 9 | | | | | | | 96 | 72 | 562.5 | 48 | 36 | 281.25 | 16 | 12 | 93.75 |

NCBPS = number of coded bits per symbol,
NDBPS = number of data bits per symbol

A utility network or smart utility network ("SUN") is a low-rate (e.g., 40 kbps to 1 Mbps) low-power WPAN that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the WPAN. The data collection point is connected by fiber, copper wire, or wireless connection to a central office that collects all the usage data for a region. Usage data is sent either directly from each utility meter to the collection point or from utility meter to utility meter until the collection point is reached in a star or mesh network formation, respectively.

During WPAN communications, a non-integer number of data bits per orthogonal frequency division multiplexing ("OFDM") symbol may result from certain configurations such as:

$N_{DSC}=100, BPSK, R=1/2, Spreading=4 \rightarrow N_{DBPS}=12.5$ $N_{DSC}=22, BPSK, R=1/2, Spreading=2 \rightarrow N_{DBPS}=5.5$ $N_{DSC}=22, BPSK, R=3/4, Spreading=1 \rightarrow N_{DBPS}=16.5$ $N_{DSC}=22, BPSK, R=1/2, Spreading=4 \rightarrow N_{DBPS}=12.5$, where $N_{DSC}$ is the number of data sub-carriers and $N_{DBPS}$ is the number of data bits per symbol. However, to obtain various efficiencies in WPAN communication, the non-integer number of data bits per OFDM symbol is eliminated for the 96, 48, 24, 12, and 4 data subcarrier groups and 8, 4, 2, 2, and 2 pilot subcarriers across IFFT sizes of 128, 64, 32, 16, and 8 in various embodiments. For oversampling, various sizes of IFFTs, such as 256 point, may be used in various embodiments. In at least one embodiment, the configuration shown in Table 1 and Table 2 is used to restrict the number of Table 2 shows the coding type, code rate, and frequency diversity spreading used for the different MCS levels in at least one embodiment. The different coding types are binary phase shift keying ("BPSK"), quadrature phase shift keying ("QPSK"), dual code modulation ("DCM") QPSK, and 16 quadrature amplitude modulation ("QAM"). Also shown is whether the output of the encoder is real. Specifically, for frequency-domain spreading plus phase rotation, there are no requirements for the pilot sub-carriers in at least one embodiment, and a complex output results. However, for frequency-domain spreading plus conjugate symmetry, the pilot sub-carriers should be such that the entire OFDM data symbol is conjugate symmetric and produces a real output in at least one embodiment. In various embodiments, the various parameters are adjusted.

TABLE 2

Example of MCS Characteristics

| MCS | Constellation | Code Rate | Frequency Domain Spreading | Real Output |
|---|---|---|---|---|
| 0 | BPSK | 1/2 | 4 | YES |
| 1 | BPSK | 1/2 | 2 | YES |
| 2 | QPSK | 1/2 | 2 | YES |
| 3 | QPSK | 3/4 | 2 | YES |
| 4 | DCM-QPSK | 1/2 | 1 | NO |
| 5 | DCM-QPSK | 5/8 | 1 | NO |
| 6 | DCM-QPSK | 3/4 | 1 | NO |
| 7 | 16 QAM | 1/2 | 1 | NO |
| 8 | 16 QAM | 5/8 | 1 | NO |
| 9 | 16 QAM | 3/4 | 1 | NO |

Code rate refers to the ratio of initial uncoded bits to the transmitted bits. Specifically, some bits are omitted or stolen at the transmitter (thus reducing the number of transmitted bits and increasing the coding rate), and de-puncturing refers to inserting zeros or "dummy bits" into the encoded bits, in place of the omitted bits, at the receiver. As such, the transmitted signal can be recovered entirely even though only some of the coded bits were transmitted. The code rate is the ratio of initial bits to transmitted bits. FIG. 1A illustrates examples of a code rate. For the code rate of 5/8, 5 bits are initially used, X0-X4. The initial 5 uncoded bits produce 10 coded bits when encoded with a rate 1/2 mother code, A0-A4 and B0-B4, after encoding. Out of the 10 bits, 2 are stolen, B1 and B3, which leaves 8 bits to be transmitted, A0, B0, A1, A2, B2, A3, A4, and B4. At the receiver, dummy bits are inserted into the positions of B1 and B3 for decoding into Y0-Y4.

Similarly, FIG. 1A illustrates a code rate of 3/4 (reduced from 6/8). The positions of the bits that are omitted make up the coding pattern.

FIGS. 2A and 2B illustrate a packet and packet header, respectively. A synchronization header ("SHR") comprises a short training field ("STF") and long training field ("LTF"). As illustrated, the STF and LTF are four and two symbols long respectively, but each can be any size in various embodiments. The STF allows a WPAN device to perform automatic gain control ("AGC"), packet detection, de-assertion of clear channel assessment ("CCA") based on CCA modes (CCA Mode 1, 2, or 3), and coarse synchronization. The LTF allows a device to perform fine synchronization, integer frequency offset estimation, and perform channel estimation. The packet header ("PHR") can be any number of data symbols or bits "M." In at least one embodiment, the PHR contains:

A Rate field specifying the data rate of the payload frame (5 bits);
One reserved bit after the Rate field;
A Frame Length field specifying the length of the payload (11 bits);
Two reserved bits after the Frame Length field;
A Scrambler field specifying the scrambling seed (2 bits);
One reserved bit after the Scrambler field;
A Header Check Sequence ("HCS"), an 8-bit cyclic redundancy check ("CRC") for the data fields only; and
Six tail bits, which are all zeros, for Viterbi decoder flushing.

The PHR is encoded at the lowest data rate (or lowest non-DCM data rate) supported for each bandwidth option in at least one embodiment. The physical layer convergence protocol service data unit ("PSDU"), which can be any number of data symbols or bits "N," carries a media access control ("MAC") sublayer frame, which comprises a MAC header, MAC payload, and MAC CRC in at least one embodiment. The PSDU also carries convolutional encoder tail-bits, which can be six zeros, and pad-bits if necessary to extend the data to fill an integer number of OFDM symbols in at least one embodiment.

For OFDM, the STF and LTF fields comprise the preamble. The Data field, comprising Service, PSDU, tail bits, and pad bits, is scrambled with a (possibly repeated) 511 length frame-synchronous scrambler in at least one embodiment. The output is separated onto two sub-carriers that are spaced sufficiently apart in frequency. When transmitting, the initial state of the scrambler is set to a pre-determined non-zero state based on the scrambling seed. In at least one embodiment, the last repetition of a group of bits in the final STF is negated at the transmitter, and the receiver can use this information to determine when the sign change takes place so that the end of the STF can be determined accurately. Specifically, the output of a correlator shows a characteristic pattern at the boundary of the STF and LTF. In various embodiments, the last 2, 3, or N repetitions are negated or the entire STF is negated. When cross-correlation is used (correlating against a known sequence), the transition that occurs from z to −z can be found by monitoring for a phase change of 180 degrees (in the noiseless case) in the correlator output.

FIG. 3 illustrates a dual carrier modulation transmitter ("DCM") 300, which provides frequency diversity without sacrificing data rate. The interleaver module 302 arranges the bits of the two data symbols together according to various algorithms in various embodiments. A two-stage interleaver is used for options 1-5 in at least one embodiment.

The bits are separated in half via separator modules 304 and 306, and each half enters a serial to parallel converter 308, 310. Next, the two halves are jointly encoded by the unitary transform module 312, and the output is separated onto two sub-carriers via the inverse fast Fourier transform module 314. If one of the two sub-carriers is experiencing noise, interference, or frequency-selective fading, then both data symbols may be recovered using the other sub-carrier. A joint maximum a posteriori ("MAP") decoder (or a lower-complexity MAP decoder that exploits max-star or max-log approximations) can be used at the receiver (not shown).

Figure 4A:
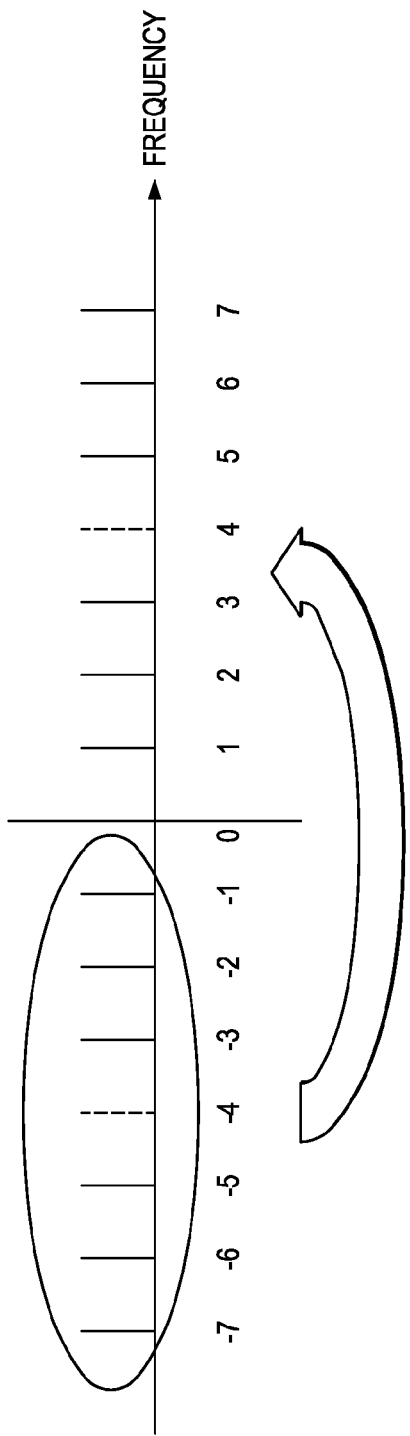
FIGS. 4A-4B illustrates a frequency diversity of 2 in accordance with at least some illustrated embodiments.

FIG. 4A illustrates how a frequency diversity of 2 can be applied in a SUN system. The x-axis in FIG. 1A represents the sub-carriers to which orthogonal frequency division multiplexing ("OFDM") symbols are encoded. The long vertical line in the center marks the DC sub-carrier, which is not used in at least one embodiment. Each solid vertical line represents one data sub-carrier in this example. The two dashed vertical lines represent pilot sub-carriers. To the left of the DC sub-carrier, the data sub-carriers are indexed from left to right as −7, −6, −5 and −3, −2, −1. The pilot sub-carrier is indexed as −4. To the right of the DC sub-carrier, the data sub-carriers are indexed from left to right as 1, 2, 3 and 5, 6, 7. The pilot sub-carrier is indexed as 4. To provide a frequency diversity of 2, the complex conjugate of a data symbol at sub-carrier −7 is encoded to sub-carrier 7. Similarly, the complex conjugates of data symbols at sub-carriers −6, −5, −3, −2, and −1 are encoded to sub-carriers 6, 5, 3, 2, and 1, respectively. In at least one embodiment, the pilot sub-carriers are used, and behave, as data sub-carriers. As such, a real signal can be generated at the transmitter by using a single digital-to-analog converter ("DAC"). Encoding occurs from positive-indexed sub-carriers to negative-indexed subcarriers in at least one embodiment.

Figure 4B:
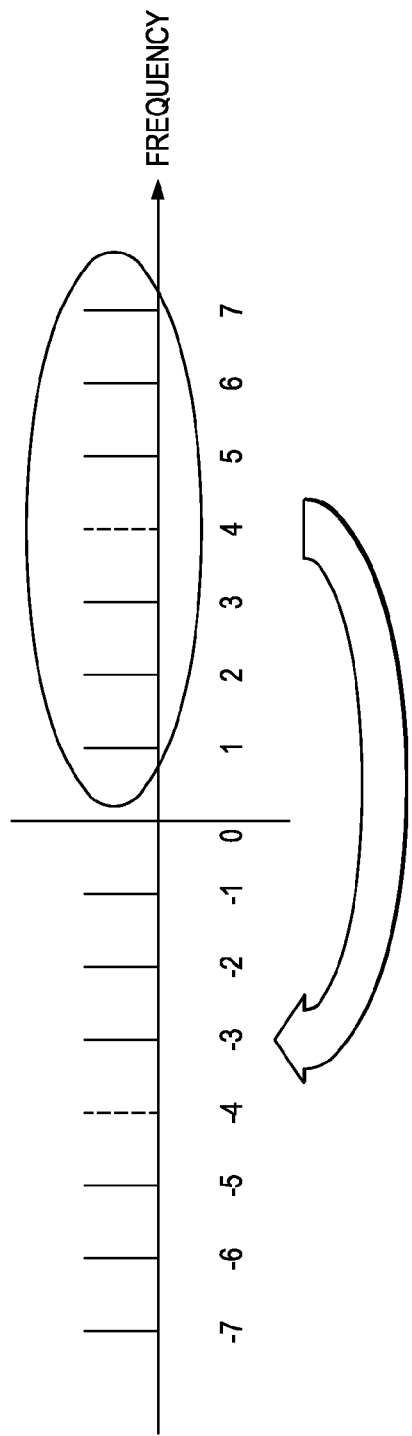

In FIG. 4B, frequency-domain spreading plus phase rotation is implemented. The sub-carrier 4 in this example is represented by a dashed line to indicate a pilot sub-carrier that carries pilot data, which is known at the receiver. Here, the data symbol in sub-carrier 1 is copied to sub-carrier −7. A phase rotation is applied to sub-carrier −7 to allow for a lower peak-to-average power ratio ("PAR") during transmission. Similarly, sub-carriers 2, 3, 5, 6, and 7 are encoded, or mapped, to sub-carriers −6, −5, −3, −2, and −1, respectively. As such, all the sub-carriers benefit from frequency diversity. In various embodiments, any number of sub-carriers is mapped to any other number of sub-carriers on either side of the DC sub-carrier.

Figure 5A:
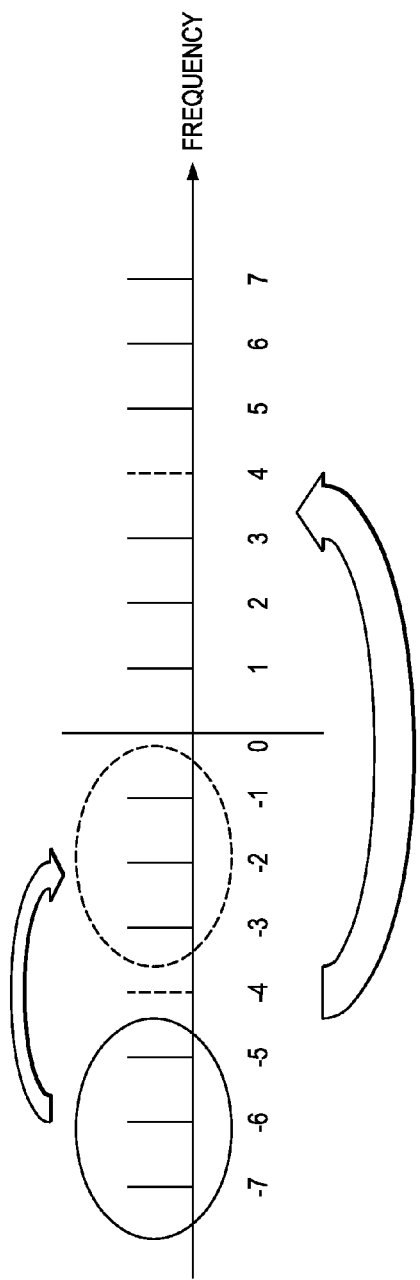
FIGS. 5A-5B illustrates a frequency diversity of 4 in accordance with at least some illustrated embodiments.

FIG. 5A illustrates a method of implementing a frequency diversity of 4. First, the data symbols at sub-carriers −7, −6, and −5 are encoded to −3, −2, and −1, respectively. As such, a frequency diversity of ¼ of the number of sub-carriers used is ensured. Next, the complex conjugates of the data symbols of the negative sub-carriers are encoded to the positive sub-carriers, similar to FIG. 1.

Figure 5B:
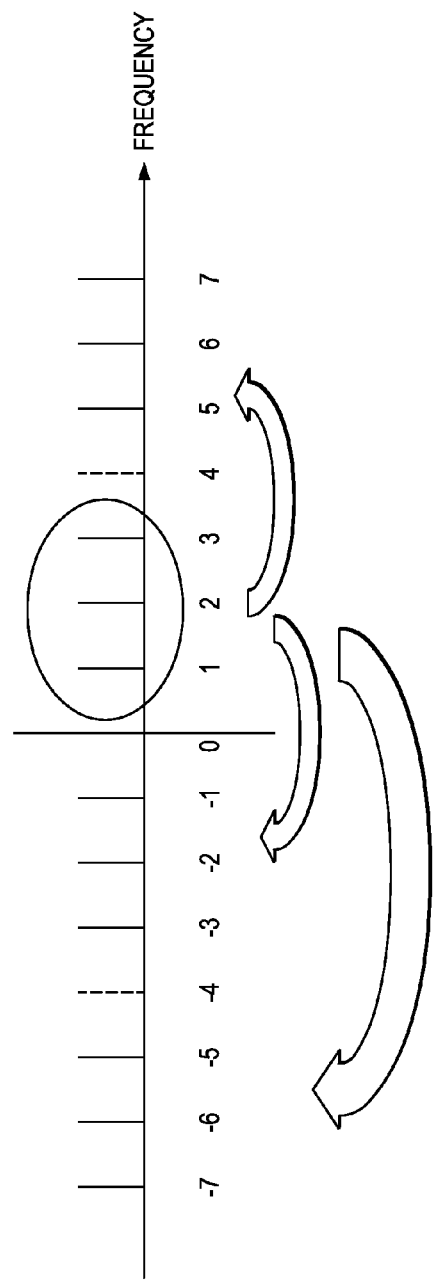

In FIG. 5B, frequency-domain spreading plus phase rotation is implemented. The data symbol in sub-carrier 1 is encoded to sub-carriers −7, −3, and 5 for frequency diversity. Phase rotations are applied to sub-carriers −7, −3, and 5 for a low PARs at the transmitter. Similarly, sub-carrier 2 is mapped to sub-carriers −6, −2, and 6; and sub-carrier 3 is mapped to sub-carriers −5, −1, and 7. As such, each sub-carrier has a frequency diversity of 4.

Figure 6:
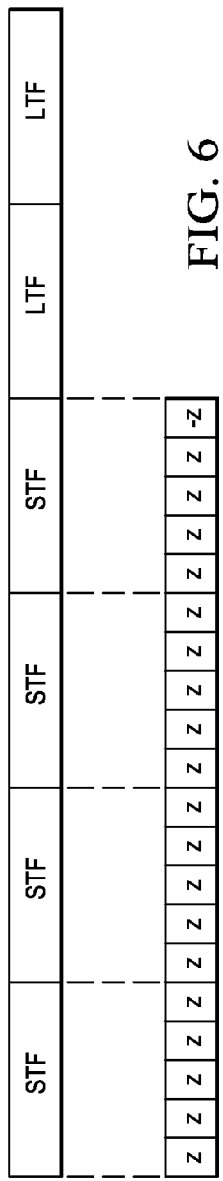
FIG. 6 illustrates negation of last STF to enable boundary detection in accordance with various illustrated embodiments.

In some embodiments, the preamble can be constructed to enable efficient boundary detection of the start of the OFDM packet. For example, FIG. 6 shows that a negation is applied for the last repetition in the STF. In at least one embodiment, the last repetition of a group of bits in the final STF is negated at the transmitter, and the receiver can use this information to determine when the sign change takes place so that the end of the STF can be determined accurately. Specifically, the output of a correlator shows a characteristic pattern at the boundary of the STF and LTF. In various embodiments, the last 2, 3, or N repetitions are negated. When cross-correlation is used (correlating against a known sequence), the transition that occurs from z to −z can be found by monitoring for a phase change of 180 degrees (in the noiseless case) in the correlator output. In FIG. 6, the "z" represents one group of bits repeated in the STF, which is itself repeated. In another embodiment, the entire final repeated STF is negated. In other embodiments, the size of the bits that are negated varies. Returning to FIG. 6, there are two OFDM symbols because the cyclic prefix is ¼ of the useful part of the OFDM symbol, and there is a repetition of 4 within the OFDM symbol due to the structure of the STF. Because the time-domain representation of the STF is real, any negative time-domain values for the last repetition are changed to positive and any positive time-domain values are changed to negative. In another embodiment the STF is complex, so the both the real and complex parts are negated for the last repetition within the last STF.

The lowest MCS levels produce real IFFT outputs, so the transmitter for these MCS levels can be simplified. For example, in at least one embodiment, only 1 DAC out of 2 is powered for low MCS levels.

In some instances, it is not necessary to have every pilot symbol present in all of the OFDM symbols. For example, if there are two pilot sub-carriers, as commonly used in option 5, then only one of the pilot sub-carriers need be transmitted. The other pilot sub-carrier is converted to a data sub-carrier in at least one embodiment. As such, instead of 4 data sub-carriers per OFDM symbol, there would be 5 data sub-carriers, and the data rate could be increased by 25%.

The pilot sub-carrier that is transmitted (i.e., not converted into a data sub-carrier) could change (or be "hopped") from one OFDM symbol to the next. For example, consider pilot sub-carriers indexed as −2 and −2. A first OFDM symbol uses the −2 sub-carrier for pilot purposes and the 2 sub-carrier for data purposes. A subsequent OFDM symbol uses the −2 sub-carrier for data purposes and the 2 sub-carrier for pilot purposes. In other words, the pilot sub-carrier has hopped from the −2 sub-carrier to the 2 sub-carrier. In various embodiments, pilot hopping is applied to various OFDM options, and pilot hopping occurs at various times and in various amounts.

Figure 7:
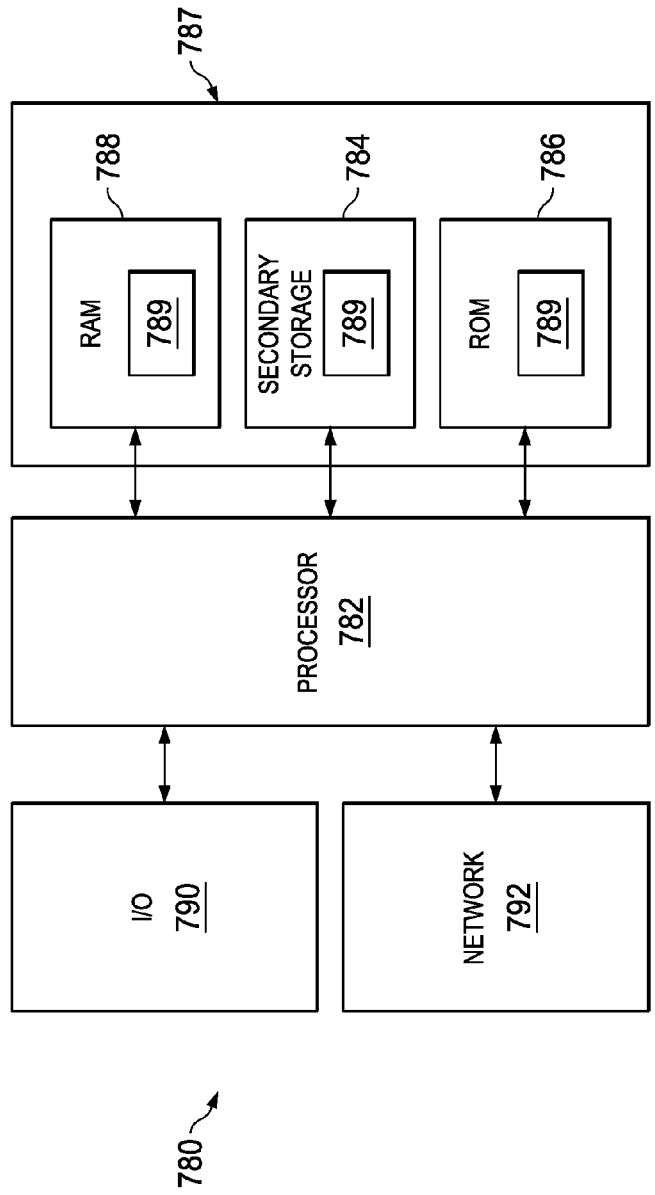
FIG. 7 illustrates a particular machine suitable for implementing one or more embodiments described herein.

The system described above may be implemented on a particular machine with sufficient processing power, memory resources, and network throughput capability to handle the necessary workload placed upon it. FIG. 7 illustrates a particular machine 780 suitable for implementing one or more embodiments disclosed herein. The computer system 780 includes one or more processors 782 (which may be referred to as a central processor unit or CPU) that are in communication with a machine-readable medium 787. The machine-readable medium 787 may comprise memory devices including secondary storage 784, read only memory (ROM) 786, and random access memory (RAM) 788. The processor is further in communication with input/output (I/O) 790 devices and network connectivity devices 792. The processor may be implemented as one or more CPU chips.

The secondary storage 784 is typically comprised of one or more disk drives, tape drives, or optical discs and is used for non-volatile storage of data and as an over-flow data storage device if RAM 788 is not large enough to hold all working data. Secondary storage 784 may be used to store programs and instructions 789 that are loaded into RAM 788 when such programs are selected for execution. The ROM 786 is used to store instructions 789 and perhaps data, which are read during program execution. ROM 786 is a non-volatile memory device that typically has a small memory capacity relative to the larger memory capacity of secondary storage. The RAM 788 is used to store volatile data and perhaps to store instructions 789. Access to both ROM 786 and RAM 788 is typically faster than to secondary storage 784.

I/O 790 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 792 devices may enable the processor 782 to communicate with an Internet or one or more intranets. With such a network connection, the processor 782 may receive information from the network, or may output information to the network in the course of performing the above-described method steps. Such information, which is often represented as a sequence of instructions 789 to be executed using processor 782, may be received from and output to the network, for example, in the form of a computer data signal embodied in a carrier wave Such information, which may include data or instructions 789 to be executed using processor 782 for example, may be received from and output to the network, for example, in the form of a computer data baseband signal or signal embodied in a carrier wave. The baseband signal or signal embodied in the carrier wave generated by the network connectivity 792 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions 789, codes, computer programs, scripts which it accesses from hard disk, floppy disk, optical disc (these various disk based systems may all be considered secondary storage 784), ROM 786, RAM 788, or the network connectivity devices 792.

In an alternative embodiment, the system may be implemented in an application specific integrated circuit ("ASIC") comprising logic configured to perform any action described in this disclosure with corresponding and appropriate inputs and outputs or a digital signal processor ("DSP") similarly configured. Such logic is implemented in a transmitter, receiver, or transceiver in various embodiments.

The above disclosure is meant to be illustrative of the principles and various embodiment of the present invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of actions can be varied from order described, and two or more actions may be performed concurrently. It is intended that the following claims be interpreted to embrace all variations and modifications.

What is claimed is:

1. A non-transitory machine-readable storage medium storing executable instructions for execution by an integrated circuit, comprising:
   first logic configured to support smart-utility-network communication using an integer number of data bits per symbol for all communications;
   second logic configured to generate a packet comprising a short training field as part of a synchronization header, a long training field as part of the synchronization header and negate one or more final repetitions of a group of bits in the short training field.

2. The non-transitory machine-readable storage medium of claim 1, comprising third logic configured to implement frequency domain spreading using BPSK.

3. The non-transitory machine-readable storage medium of claim 1, comprising fourth logic configured to receive and decode a second smart-utility-network communication.

4. A non-transitory machine-readable storage medium storing executable instructions that, when executed, cause one or more processors to:
   support smart-utility-network communication using an integer number of data bits per symbol for all communications;
   generate a packet comprising a short training field as part of a synchronization header and a long training field as part of the synchronization header;
   negate one or more final repetitions of a group of bits in the short training field.

5. A device, comprising:
   a transceiver with a physical layer;
   wherein the physical layer is configured for smart-utility-network operations using OFDM with frequency domain spreading;
   wherein the transceiver generates a packet comprising a short training field as part of a synchronization header and a long training field as part of the synchronization header;
   negates one or more final repetitions of a group of bits in the short training field.

* * * * *